(12) United States Patent
Tandler et al.

(10) Patent No.: US 10,507,811 B2
(45) Date of Patent: Dec. 17, 2019

(54) HYDRAULIC BLOCK FOR A HYDRAULIC UNIT OF A BRAKE CONTROL SYSTEM

(71) Applicant: Robert Bosch GmbH, Stuttgart (DE)

(72) Inventors: Juergen Tandler, Fuessen (DE); Matthias Mayr, Rettenberg (DE); Andreas Weh, Sulzberg (DE)

(73) Assignee: Robert Bosch GmbH, Stuttgart (DE)

(*) Notice: Subject to any disclaimer, the term of this patent is extended or adjusted under 35 U.S.C. 154(b) by 0 days.

(21) Appl. No.: 15/209,677

(22) Filed: Jul. 13, 2016

(65) Prior Publication Data

US 2017/0021813 A1 Jan. 26, 2017

(30) Foreign Application Priority Data

Jul. 20, 2015 (DE) .......................... 10 2015 213 569

(51) Int. Cl.
| | | |
|---|---|---|
| *B60T 8/36* | (2006.01) | |
| *B60T 8/48* | (2006.01) | |
| *B60T 8/40* | (2006.01) | |

(52) U.S. Cl.
CPC ............. *B60T 8/368* (2013.01); *B60T 8/4081* (2013.01); *B60T 8/4872* (2013.01)

(58) Field of Classification Search
CPC ........ B60T 8/363; B60T 8/4872; B60T 8/368; B60T 8/4081
USPC .................................................. 303/DIG. 10
See application file for complete search history.

(56) References Cited

U.S. PATENT DOCUMENTS

| 5,016,442 | A | * | 5/1991 | Zander | B60T 11/22 340/452 |
|---|---|---|---|---|---|
| 5,874,797 | A | * | 2/1999 | Pinkerton | H02K 7/025 310/112 |
| 2001/0052258 | A1 | * | 12/2001 | Ehrlich | B60T 8/00 73/115.08 |
| 2004/0207256 | A1 | * | 10/2004 | Volz | B60T 8/368 303/119.3 |
| 2007/0228820 | A1 | * | 10/2007 | Nakamura | B60T 8/3225 303/119.3 |
| 2013/0234501 | A1 | * | 9/2013 | Leiber | B60T 8/4018 303/10 |
| 2014/0124067 | A1 | * | 5/2014 | Feser | F15B 13/0405 137/551 |
| 2016/0016567 | A1 | * | 1/2016 | Jurgens | B60T 7/042 303/10 |

FOREIGN PATENT DOCUMENTS

| DE | 102008020934 A1 | 10/2009 |
|---|---|---|
| WO | WO2012150120 A1 | 8/2012 |

* cited by examiner

*Primary Examiner* — Melody M Burch
(74) *Attorney, Agent, or Firm* — Norton Rose Fulbright US LLP; Gerard Messina

(57) ABSTRACT

A hydraulic block for brake control of an automotive hydraulic braking system, including a main brake cylinder bore. A permanent magnet is connected to the main brake cylinder piston via a rod, so that the permanent magnet moves together with the main brake cylinder piston. A Hall sensor with which a position and/or a stroke of the main brake cylinder piston is measurable is situated in a signal range of the permanent magnet in a sensor bore in the hydraulic block transversely to the rod.

1 Claim, 1 Drawing Sheet

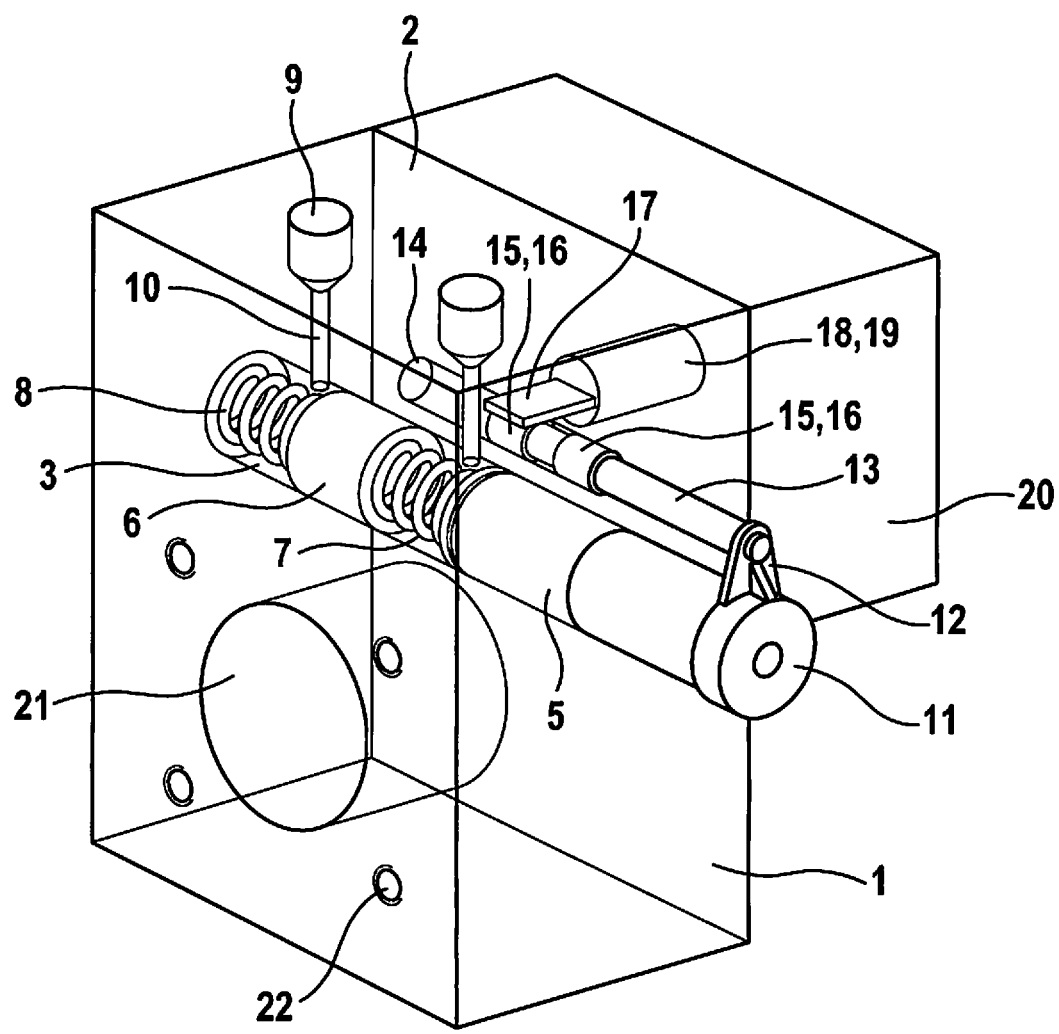

HYDRAULIC BLOCK FOR A HYDRAULIC UNIT OF A BRAKE CONTROL SYSTEM

CROSS REFERENCE

The present application claims the benefit under 35 U.S.C. § 119 of German Patent Application No. DE 102015213569.1 filed on Jul. 20, 2015, which is expressly incorporated herein by reference in its entirety.

BACKGROUND INFORMATION

The present invention relates to a hydraulic block for a hydraulic unit of a brake control system of a hydraulic automotive braking system.

A brake control system regulates wheel brake pressures and thus wheel braking forces of hydraulic wheel brakes of a hydraulic automotive braking system. Antilock braking systems, traction control systems and electronic stability programs, whose respective abbreviations are ABS, ASR and ESP, are possible, for example. The hydraulic block is provided for an automotive power braking system in particular.

Such hydraulic blocks are typically cubical metal blocks, usually made of aluminum or an aluminum alloy. These blocks are rectangular, approximately square, and have an approximate height of ¼-⅓ of a width or length. The hydraulic blocks have cylindrical, stepped-diameter blind holes as receptacles for hydraulic components of the brake control, connected by bores in the hydraulic block as lines, i.e., interconnected hydraulically and connectable to a main brake cylinder and to wheel brakes. Hydraulic components of brake controls of hydraulic automotive braking systems include, for example, solenoid valves, check valves, throttles, hydraulic accumulators, dampers and hydraulic pumps, which are installed in receptacles in the hydraulic block, usually being pressed into place and sealed in the receptacles by circumferential caulking to be fluid-tight and pressure-resistant.

Such a hydraulic block is described in International Patent Application WO 2012/150 120 A1. The conventional hydraulic block has the special feature of the main brake cylinder being integrated into it, i.e., the conventional hydraulic block has a main brake cylinder bore to receive two pistons of a dual-circuit main brake cylinder. The International Patent Application also describes a sensor for one stroke of the two main brake cylinder pistons as such without any specifications about the type and arrangement of the sensor.

German Patent Application No. DE 10 2008 020 934 A1 describes a dual-circuit main brake cylinder, whose rod piston protrudes out of the main brake cylinder, where it has a coupling flange. A rod situated in parallel with the main brake cylinder and displaceably held in a bore created parallel to the main brake cylinder bore in the main brake cylinder is in contact with the coupling flange. The rod has a permanent magnet inside the bore, which is also moved along with the rod piston. In addition to the bore for the rod, a position-detecting sensor, which detects a relative movement between the permanent magnet, which moves along with the rod piston, and the position-detecting sensor, and outputs a corresponding signal is mounted on the outside of the main brake cylinder next to the bore for the rod. A helical compression spring is provided as a restoring spring in the bore, forcing the rod against the coupling flange of the rod piston, so that the rod including the permanent magnet moves together with the rod piston. The rod piston is a main brake cylinder piston, which is mechanically connected by a pedal rod to a foot brake pedal.

SUMMARY

The hydraulic block according to the present invention for a brake control system of an automotive hydraulic braking system has a main brake cylinder bore in which a main brake cylinder piston is accommodated so that it is axially displaceable. A signal generator is connected to the main brake cylinder piston, so that it is secured axially. A sensor within the signal range of the signal generator, which measures a signal of the signal generator by a noncontact method, is situated in a sensor bore in the hydraulic block. The present invention permits a noncontact measurement of the piston stroke of the main brake cylinder piston. The signal generator is preferably passive, i.e., it does not require energy. A bore in the sense of the present invention need not be manufactured by drilling but may be manufactured generally arbitrarily. A bore in the sense of the present invention is a straight hole, which preferably but not necessarily has a circular cross section, so that the cross section is constant or may vary. A bore is preferably longer than its diameter.

By accommodating the sensor in a sensor bore in the hydraulic block, the sensor is separated hydraulically from the main brake cylinder bore in the hydraulic block, so there is no risk of leakage of the main brake cylinder bore due to the mounting of the sensor.

The hydraulic block may be a main brake cylinder. However, it preferably has receptacles for hydraulic components of a brake control, such as solenoid valves, check valves, hydraulic accumulators, damper chambers, one or multiple hydraulic pumps which are interconnected hydraulically by a bore in the hydraulic block. The term "interconnection" means that the receptacles are interconnected as provided for in a hydraulic diagram of the brake control system. The hydraulic block according to the present invention preferably also has connections for wheel brakes, which are hydraulically interconnected for the hydraulic components of the brake control system through the bore with the receptacles, i.e., connected to receptacles provided for this purpose. The hydraulic block may also be interpreted as a hydraulic unit, equipped with the hydraulic components, and forms such a unit or at any rate forms a core part of the brake control.

The hydraulic block according to the present invention is preferably provided for a power braking system and has a receptacle for one or multiple hydraulic pumps, which are used to generate a brake pressure for power braking, regardless of the muscular strength of a vehicle driver. The receptacle for the hydraulic pump is, for example, a cylinder bore for a pump piston of a piston pump as the hydraulic pump. For example, an electric motor of the hydraulic pump may also be mounted on the outside of the hydraulic block.

The sensor for noncontact measurement of the movement of the signal generator, which moves along with the main brake cylinder piston, may have an electronic system for analyzing the signal of the signal generator, which generates a finished digital or analog measured value, which is dependent on the signal of the signal generator proportionally or in some other way or, better yet, dependent on a movement of the signal generator and thus of the main brake cylinder piston. The sensor may have an integrated circuit as the electronic system or may be part of such an integrated circuit. In the latter case, it may also be referred to as an integrated sensor or as a sensor having integrated signal processing.

An arrangement of the signal generator on the main brake cylinder piston is possible. An embodiment of the present invention may provide that the signal generator is accommodated in a separate signal generator bore, which is placed in parallel to the main brake cylinder bore in the hydraulic block. The signal generator is secured axially to the main brake cylinder piston by a mechanical connection, for example, which may also be situated outside of the hydraulic block, so that the signal generator moves along with the main brake cylinder piston. The signal generator bore in parallel to the main brake cylinder bore in the hydraulic block prevents leakage of the main brake cylinder bore in the area of the signal generator. Another advantage is the accommodation of the signal generator in the hydraulic block, i.e., a compact and space-saving design of the hydraulic block.

An embodiment of the present invention may further provide an arrangement of the sensor bore radially to the main brake cylinder bore and to the signal generator bore. This also includes a sensor bore running in parallel with an offset from a radial line of the main brake cylinder bore and the signal generator bore in the hydraulic block. The latter denotes a sensor bore situated tangentially to the main brake cylinder bore and signal generator bore in the hydraulic block. This design of the present invention means or at any rate enables a Cartesian drilling of the hydraulic block, i.e., bores in the hydraulic block, running in parallel or perpendicular to one another and to edges and outside surfaces of the hydraulic block, as long as the hydraulic block is cube-shaped. Cartesian drilling of a cube-shaped hydraulic block appears to be favorable from a practical standpoint.

The sensor may be situated on a rod, which is inserted into the sensor bore or otherwise situated there, permitting a simple and automated installation of the sensor in the hydraulic block.

Lengthening of a measurement path and/or a higher resolution is/are possible due to multiple signal generators affixed axially to the main brake cylinder piston may also be provided according to an embodiment of the present invention. The signal generators may be situated one after the other in a displacement direction but a different arrangement of the signal generators is also conceivable. The signals of the signal generator may be measured by using one or multiple sensors.

BRIEF DESCRIPTION OF THE DRAWINGS

The present invention is explained in greater detail below on the basis of a specific embodiment illustrated in the FIGURE.

The FIGURE shows a hydraulic block according to the present invention in a perspective representation. The FIGURE is simplified and schematized, and facilitates the explanation and the understanding of the present invention.

DETAILED DESCRIPTION OF EXAMPLE EMBODIMENTS

Hydraulic block 1 according to the present invention as illustrated in the FIGURE is made of an aluminum alloy in a cube shape with rectangular flat sides and a thickness amounting to approximately ¼ of a width. It is shown as being transparent for the sake of illustration. Hydraulic block 1 has a main brake cylinder bore 3, designed as a blind hole having an open end and a closed end, in parallel to a transverse side 2 and at a distance from it. Two main brake cylinder pistons 5, 6 are accommodated axially displaceably in main brake cylinder bore 3, one piston of which is referred to as a rod piston 5 and the other piston as a pressure piston 6. Other terms for the two pistons include primary piston for rod piston 5 and secondary piston or floating piston for the pressure piston 6. Two pistons 5, 6 are mutually supported on a closed end of main brake cylinder bore 3 including a helical compression spring as first piston spring 7, and pressure piston 6 is supported by using an additional helical compression spring as second piston spring 8. Rod piston 5 protrudes out of hydraulic block 1 on the open end of main brake cylinder bore 3. It is connected to a piston rod (not shown) for displacement with the aid of a foot brake pedal, also not shown.

In transverse side 2, hydraulic block 1 has two cylindrical countersinks as connections 9 for a brake fluid reservoir (not shown), which may be situated on transfer side 2 of hydraulic dock 1. Two connections 9 are connected through bores as lines 10 to main brake cylinder bore 3.

As described above, rod piston 5 protrudes out of hydraulic block 1. A cap 11, including a flexurally rigid strap 12 protruding from it laterally, is placed on a protruding end of rod piston 5. A rod 13 is mounted on strap 12 in parallel to rod piston 5, which is inserted into a signal generator bore 14 which is placed in parallel and next to main brake bore 3 in hydraulic block 1. Holes in hydraulic block 1 are referred to as bores, regardless of how they are manufactured, i.e., the bores need not be manufactured by drilling but may also be created arbitrarily. The bores preferably but not necessarily have circular cross sections, which may be constant over the length of the bores or may change. The lengths of the bores are preferably several times greater than their diameters. Rod 13 is rigidly and therefore axially fixedly connected to rod piston 5 through cap 11 and strap 12, this rod piston 5 being one of two main brake cylinder pistons 5, 6. Rod 13 thus moves together with rod piston 5. Rod 13 in signal generator bore 14 in hydraulic block 1 has two permanent magnets 15, which may in general also be interpreted as signal generators 16. Via rod 13, signal generators 16 are connected rigidly and therefore in an axially fixed manner to rod piston 5, so they move together with it. Permanent magnets 15 are situated one after the other at a slight distance from one another on rod 13 and thus at a slight distance in a displacement direction of rod 13 and of rod piston 5. Generally, one permanent magnet 15 or one signal generator 16 is sufficient. However, more than two permanent magnets 15 or signal generators 16 may also be provided.

A sensor 17 is situated in hydraulic block 1, which measures the signals of signal generators 16 by a noncontact method, in a signal range of signal generators 16, i.e., in the range of the magnetic fields of permanent magnets 15. In the specific embodiment, sensor 17 is a Hall sensor, namely a 3D Hall sensor. An angle of magnetic field lines of the magnetic fields of permanent magnets 15 is measurable using the 3D Hall sensor, and a position and/or displacement of rod piston 5 may be ascertained from the angle or a change in the angle of the magnetic field lines during a displacement of rod piston 5, which is a main brake cylinder piston. Using a simple Hall sensor, it is possible to measure a magnetic field strength or a change in field strength of the magnetic fields of permanent magnets 15 during a displacement of rod piston 5, and the position and/or a displacement path of rod piston 5 may thus be ascertained. Other sensor systems as permanent magnets 15 and as signal generators 16, and a Hall sensor as sensor 17, are also possible, for example, for an inductive or capacitive measurement. Use of two signal generators 16 lengthens the measurement path and/or increases the resolution and thereby increases the measuring accuracy. As already stated, one signal generator 16 is generally sufficient. Sensor 17 is an integrated sensor, i.e., it is integrated into an integrated circuit, which analyzes the direction of the magnetic field lines or field strengths of the magnetic fields of permanent magnets 15 or in general the signals of signal generators 16 or their change during a displacement of permanent magnets 15 or signal generators 16 during a displacement of rod piston 5, and supplies a signal for the position and/or displacement of rod piston 5, which is a main brake cylinder piston.

Sensor 17 is mounted on one end of a sensor holder 18, which is inserted into a sensor bore 19 in hydraulic block 1, in which sensor 17 is thus also situated. Sensor bore 19 is placed in parallel to a radial line to sensor bore 14 in hydraulic block 1, an imaginary generated surface of sensor bore 19 intersecting signal generator bore 14, so that sensor 17 is close to permanent magnets 15, which form signal generators 16. Sensor 17 is therefore situated within the signal range of signal generators 16. In this specific embodiment, sensor bore 19 ends before signal generator bore 14, so that there is no connection between these two bores 14, 19. No separation of sensor bore 19 from signal generator bore 14 is necessary because signal generator bore 14 is separated from main brake cylinder bore 3 and therefore there is no leakage from main brake cylinder bore 3 into signal generator bore 14 needing to be taken care of. The plate-shaped integrated sensor 17 in the specific embodiment, is accommodated in a slot at the base of sensor bore 19 in hydraulic block 1, so that its position in hydraulic block 1 is defined precisely, which is a prerequisite for accurate determination of the position of rod piston 5.

One end of sensor holder 18 remote from sensor 17 is flush with a flat side or in general an exterior side of hydraulic block 1, when sensor holder 18 together with sensor 17 is inserted into sensor bore 19 as intended. On this end, sensor holder 18 has spring contacts, which are resilient in the longitudinal direction of sensor holder 18 and are not visible in the drawing. At the side of hydraulic block 1, where the spring contacts of sensor holder 18 are situated, an electronic control unit 20 is mounted on hydraulic block 1. Electronic control unit 20 has mating contacts, which are not visible in the drawing and automatically make contact with the spring contacts of sensor holder 18 due to the mounting of control unit 20 on hydraulic block 1. In this way, sensor 17 is contacted automatically when control unit 20 is mounted on hydraulic block 1, i.e., sensor 17 is automatically connected electrically to electronic control unit 20. There are no additional interfaces or plugs for electrical connection of sensor 17 to electronic control unit 20, which increases the reliability.

In addition to connections 9 for the brake fluid reservoir, hydraulic block 1 has connections for wheel brakes and receptacles for hydraulic components of a brake control system, such as solenoid valves, hydraulic accumulators and damper chambers, not shown here for the sake of clarity. These receptacles are designed as cylindrical stepped-diameter blind holes, into which the hydraulic components may be pressed and sealed by self-caulking ("self-clinching"). A pump bore 21 for a pump piston of a piston pump as a hydraulic pump is shown for the brake control system and/or a power braking system or a power-assisted braking system. Female thread holes 22 in hydraulic block 1 for fastening an electric motor and a spindle drive for displacement of a pump piston in pump bore 21 are provided around pump bore 21. Connections 9, receptacles for hydraulic components, main brake cylinder bore 3 and pump bore 21 are hydraulically interconnected by drilling of hydraulic block 1, i.e., they are interconnected according to a hydraulic diagram of the brake control system. Such hydraulic blocks 1 are essentially known, assembled with the hydraulic components they form a hydraulic unit for a brake control system, i.e., an, in particular, wheel-individual regulation of wheel brake pressures and thus wheel braking forces. Such brake control systems include, for example, an antilock brake system, a traction control system and/or an electronic stability program, colloquially referred to as wheel-skid protection system. Abbreviations such as ABS, ASR, and ESP are conventionally used for such brake control systems. This list is given as an example but is not conclusive. Electronic control unit 20 controls the hydraulic components, i.e., it carries out the brake control. Hydraulic block 1 is provided for a power brake application, in which a brake pressure is generated by a hydraulic pump by displacing a pump piston (not shown) in piston bore 21 and not by main brake cylinder pistons 5, 6. These and rod piston(s) 5 function(s) only as setpoint generators for a brake pressure or wheel braking forces during the power brake application. In the event of failure of the hydraulic pump, the brake pressure is generated by main brake cylinder pistons 5, 6. However, the present invention may also be used for a brake control system of a hydraulic automotive braking system actuated by muscular strength or by power assistance.

The flat side or the side on which electronic control unit 20 is mounted may also be referred to as the mounting surface of hydraulic block 1 for electronic control unit 20.

What is claimed is:
1. A hydraulic block for a brake control system of a hydraulic automotive braking system, wherein the hydraulic block has a main brake cylinder bore in which a main brake cylinder piston is axially displaceably accommodated, a signal generator connected to the main brake cylinder piston in an axially fixed manner, and a sensor which measures a signal of the signal generator by a noncontact method, wherein the hydraulic block includes a sensor bore in which the sensor is situated in a signal range of the signal generator, wherein:
   the hydraulic block includes a signal generator bore parallel to the main brake cylinder bore,
   a length of the sensor bore extends into the hydraulic block along a direction that is transverse to and radially displaced from an axis of the signal generator bore,
   the signal generator is situated in the signal generator bore and moves together with the main brake cylinder piston,
   the signal generator is connected to a rod which is connected in an axially fixed manner to the main brake cylinder piston, the rod being situated in the signal generator bore,
   a cap is mounted to a first end of the main brake cylinder piston that protrudes from the hydraulic block,
   a strap is mounted on the cap, and
   a first end of the rod that protrudes from the hydraulic block is mounted on the strap such that the main brake cylinder piston and the rod are connected in an axially fixed manner via the cap and the strap.

\* \* \* \* \*